United States Patent [19]
Moore

[11] Patent Number: 5,109,639
[45] Date of Patent: May 5, 1992

[54] DOCK SEAL
[75] Inventor: David W. Moore, Ajax, Canada
[73] Assignee: Super Seal Mfg. Ltd., Ontario, Canada
[21] Appl. No.: 494,123
[22] Filed: Mar. 15, 1990

Related U.S. Application Data
[63] Continuation of Ser. No. 307,510, Feb. 8, 1989, Pat. No. 4,916,870.

[51] Int. Cl.⁵ .............................................. E04B 1/34
[52] U.S. Cl. .................................. 52/2.12; 52/173.05
[58] Field of Search ................. 52/2 B, 2 C, 173 DS, 52/2.12, 2.14

[56] References Cited
U.S. PATENT DOCUMENTS

| | | |
|---|---|---|
| 3,166,799 | 1/1965 | Birnkrunt ........................ 52/2 R |
| 3,303,615 | 10/1974 | O'Neal . |
| 3,391,502 | 11/1976 | O'Neal . |
| 3,391,503 | 1/1988 | O'Neal . |
| 3,476,338 | 7/1980 | Fisher . |
| 3,714,745 | 4/1981 | O'Neal . |
| 3,843,987 | 2/1973 | Lodjic . |
| 3,845,591 | 2/1976 | Stine . |
| 3,939,614 | 11/1969 | Frommelt et al. . |
| 3,994,103 | 7/1968 | Ouellet . |
| 4,020,607 | 5/1977 | Bjerrig ........................ 52/2 C |
| 4,213,279 | 7/1968 | Layne . |
| 4,262,458 | 2/1976 | O'Neal . |
| 4,322,923 | 4/1982 | O'Neal . |
| 4,365,452 | 12/1982 | Fillman et al. . |
| 4,750,299 | 11/1974 | Frommelt et al. . |

FOREIGN PATENT DOCUMENTS

| | | |
|---|---|---|
| 844877 | 4/1969 | Canada . |
| 958946 | 6/1970 | Canada . |
| 1079125 | 12/1974 | Canada . |
| 844999 | 6/1980 | Canada . |
| 1554001 | 4/1969 | Fed. Rep. of Germany . |
| 1124268 | 6/1956 | France . |

Primary Examiner—Henry E. Raduazo
Attorney, Agent, or Firm—Klauber & Jackson

[57] ABSTRACT

An inflatable dock seal for mounting about a loading dock opening to provide a cushioned seal against a vehicle has an upper inflatable curtain and a pair of inflatable side members; the side members inflate laterally of the opening directly towards each other along a phantom axis of inflation which is perpendicular to a phantom axis of entry of the opening; the side members are in particular L-shaped and inflate laterally of the L-shape; the inflatable foot of the L-shape forming a bottom seal extending from the wall to the leg of the L-shape spaced from the wall; the spacing of the leg of the L-shape from the wall provides a window for entry of natural light to the opening.

13 Claims, 5 Drawing Sheets

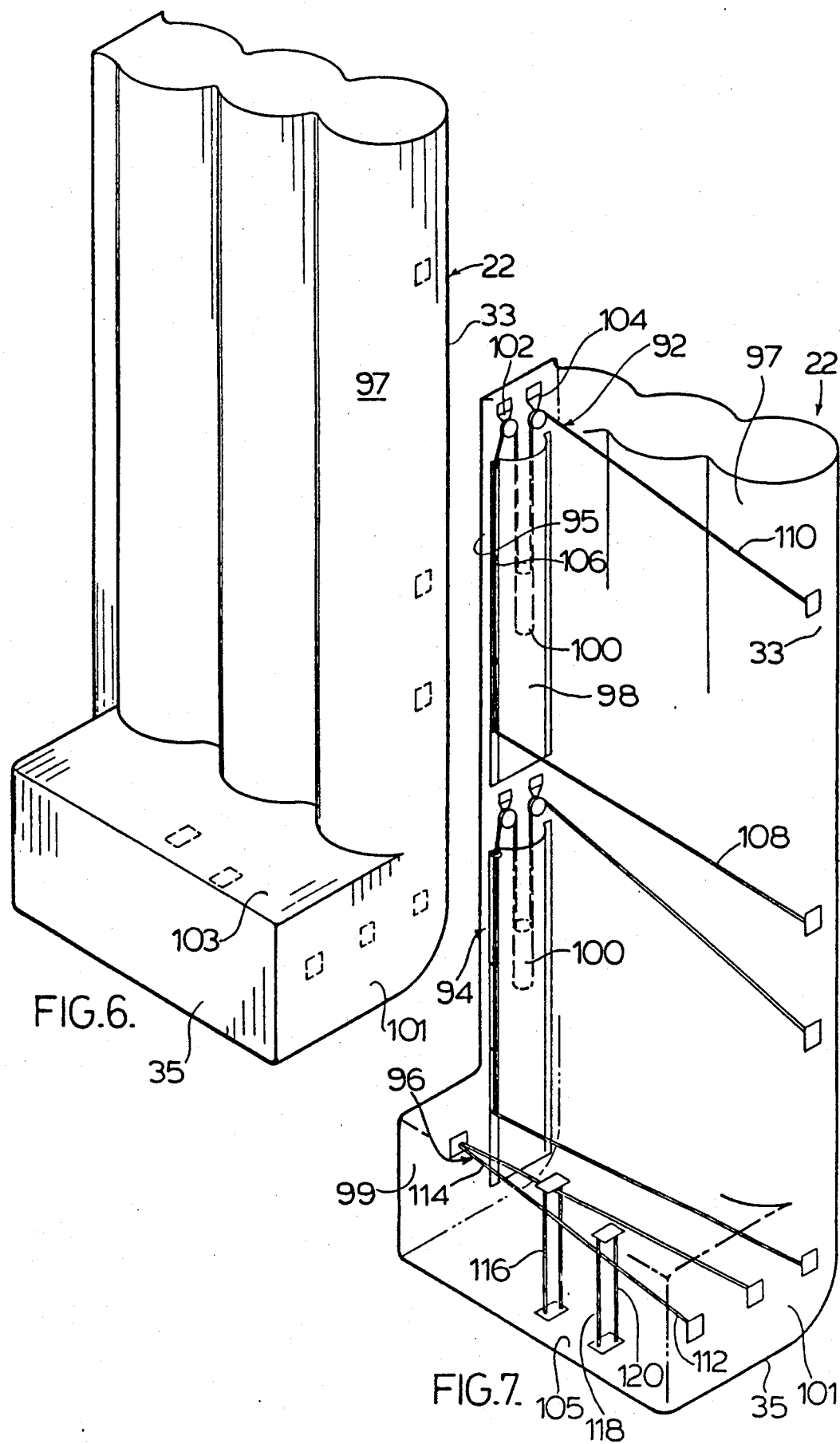

DOCK SEAL

This is a continuation of application Ser. No. 307,510, filed Feb. 8, 1989 and now U.S. Pat. No. 4,916,870.

BACKGROUND OF THE INVENTION i) Field of the Invention

This invention relates to a dock seal device for loading dock openings in a wall and to seal elements of such a device, more especially the invention is concerned with an inflatable dock seal device and inflatable dock seal elements.

ii) Description of the Prior Art

Inflatable dock seals are known from U.S. Pat. Nos. 3,303,615; 3,714,745 (Canadian Patent 958,946); 3,391,502 (Canadian Patent 844,999) and 3,391,503 (Canadian Patent 844,877) all of Larry O'Neal, and from U.S. Pat. No. 3,994,103 (Canadian Patent 1,079,125) of Wilfred Ouellet. These generally comprise a top, hollow, flexible, inflatable, horizontal section and a pair of side, hollow, inflatable, vertical sections arranged about a loading dock opening. These sections may constitute three separate members independently mounted about the opening with their interiors in air flow communication as described in U.S. Pat. No. 3,714,745 or they may constitute a single generally U-shaped member as shown in U.S. Pat. Nos. 3,303,615; 3,391,502; 3,391,503 and 3,994,103.

The dock seal devices serve to seal the loading area in which personnel operate from the external environment so that personnel are sheltered during poor weather. In addition the seal devices serve to prevent loss of heat from a heated building to a cold environment, and access to the building of cold air during winter, and conversely to prevent access of hot humid air to a cooled or air-conditioned building during summer.

Dock seals of the general type comprising separate members, such as shown in in U.S. Pat. No. 3,714,745, have the advantage that the members can be spaced, at the time of installation, about the dock opening, so that they do not interfere or intrude into the entry passage in front of the opening, into and out of which a truck is to be brought into register for loading and unloading, and additionally they can be more readily adapted to different size openings.

As can be seen from FIGS. 3 and 4 in U.S. Pat. No. 3,714,745, the vertical side members inflate along an arcuate path or, otherwise stated, have an arcuate axis of inflation, whereby in the non-inflated or collapsed configuration shown in FIG. 3 of the Patent, the collapsed, vertical, side members are retracted away from the dock opening; and in the inflated configuration shown in FIG. 4, the free outer ends of the side members, which engage the truck, are spaced forwardly of the dock opening so as not to interfere or intrude into the loading area where there is a risk of damage to the flexible members such as by fork lift trucks operating in the loading area.

Disadvantages of dock seals of the general type shown in U.S. Pat. 3,391,503 are that the arcuate, inflated side members become floppy with increasing arcuate length and for practical purposes the arcuate length cannot exceed about 2 ft. Furthermore the gap between the arcuately inflated members and the wall of the opening produces an open bottom which reduces the sealing efficiency and permits access of heated air from the building to the atmosphere, and entry of cold air, in winter, or access of warm external air to a cooled environment within the building in summer. Loose flaps of sheet material are sometimes provided to bridge the gap and which must be manually fastened and unfastened before and after use to the wall, however, personnel tend to ignore them because of the inconvenience involved in assembling the flaps.

A disadvantage shared by all of the dock seals of the afore-mentioned Patents is that in sealing the opening they exclude natural light so that the loading area is often only dimly lit by artificial lights within the building which are often remotely spaced from the opening so that lighting is inadequate and the working environment uncomfortable.

Another disadvantage shared by all dock seal devices of the afore-mentioned Patents is that they have not addressed the problem of rain water or the like seeping between the horizontal seal section and the truck, into the loading area.

In the seal device of U.S. Pat. No. 3,714,745, the roof of the upper support is flat and inclined downwardly towards the truck as can be seen from FIGS. 2 and 5 of that Patent. Thus rain water flows from the flat roof onto the roof and sides of the truck and may seep between the truck and the seal members, particularly with movement of the truck to adjust its position.

In the seal devices of the other Patents, for example, U.S. Pat. No. 3,391,503 it can be seen that rain water will flow downwardly over the convex surface of the horizontal section.

SUMMARY OF THE INVENTION

It is a general object of the present invention to provide a dock seal device overcoming the afore-mentioned disadvantages.

It is a particular object of the invention to provide a dock seal device in which the inflatable members can be readily spaced about openings of different sizes and in which the vertical members have a greater axial length of inflation than previously possible.

It is another particular object of the invention to provide a dock seal device and dock seal elements having an inflatable bottom seal to bridge the lower gap between the building wall and the vertical members.

It is still another particular object of the invention to provide a dock seal device in which the vertical, inflatable side members are spaced from the wall permitting access of natural light to the loading area.

It is yet another particular object of the invention to provide a dock seal device in which rain water and the like is directed laterally away from the loading area.

In accordance with the invention an inflatable dock seal is provided for positioning about an opening in a wall. The seal has an upper, inflatable member and a pair of inflatable side members in opposed, spaced apart relationship. The side members each have outer and inner ends in facing relationship, which facing relationship is maintained throughout inflation of the side members.

Thus, in particular, the side members inflate laterally of the opening about which they are mounted, directly towards each other, and their respective inner and outer ends are all maintained in opposed facing relationship during inflation.

In other words the opening has a phantom axis of entry generally perpendicular to the face of the wall and the side members inflate along a phantom axis of inflation perpendicular to the phantom axis of entry.

In a further aspect of the invention there is provided a dock seal element which may form an inflatable side member of the seal; the element comprising an inflatable seal member of generally L-shaped configuration having an elongate, inflatable leg portion and a short, inflatable foot portion. An inlet means in the member permits entry of inflating gas. The leg portion and the foot portion have a major axis or direction of inflation, laterally of the L-shape.

BRIEF DESCRIPTION OF THE DRAWINGS

The invention is illustrated in a particular and preferred embodiment by reference to the accompanying drawings in which:

FIG. 6 is a perspective view of a vertical inflatable seal member of the dock seal device of the invention; and FIG. 7 is a perspective view similar to FIG. 6 but showing the interior of the seal.

DESCRIPTION OF PREFERRED EMBODIMENT WITH REFERENCE TO THE DRAWINGS

Figure 1:
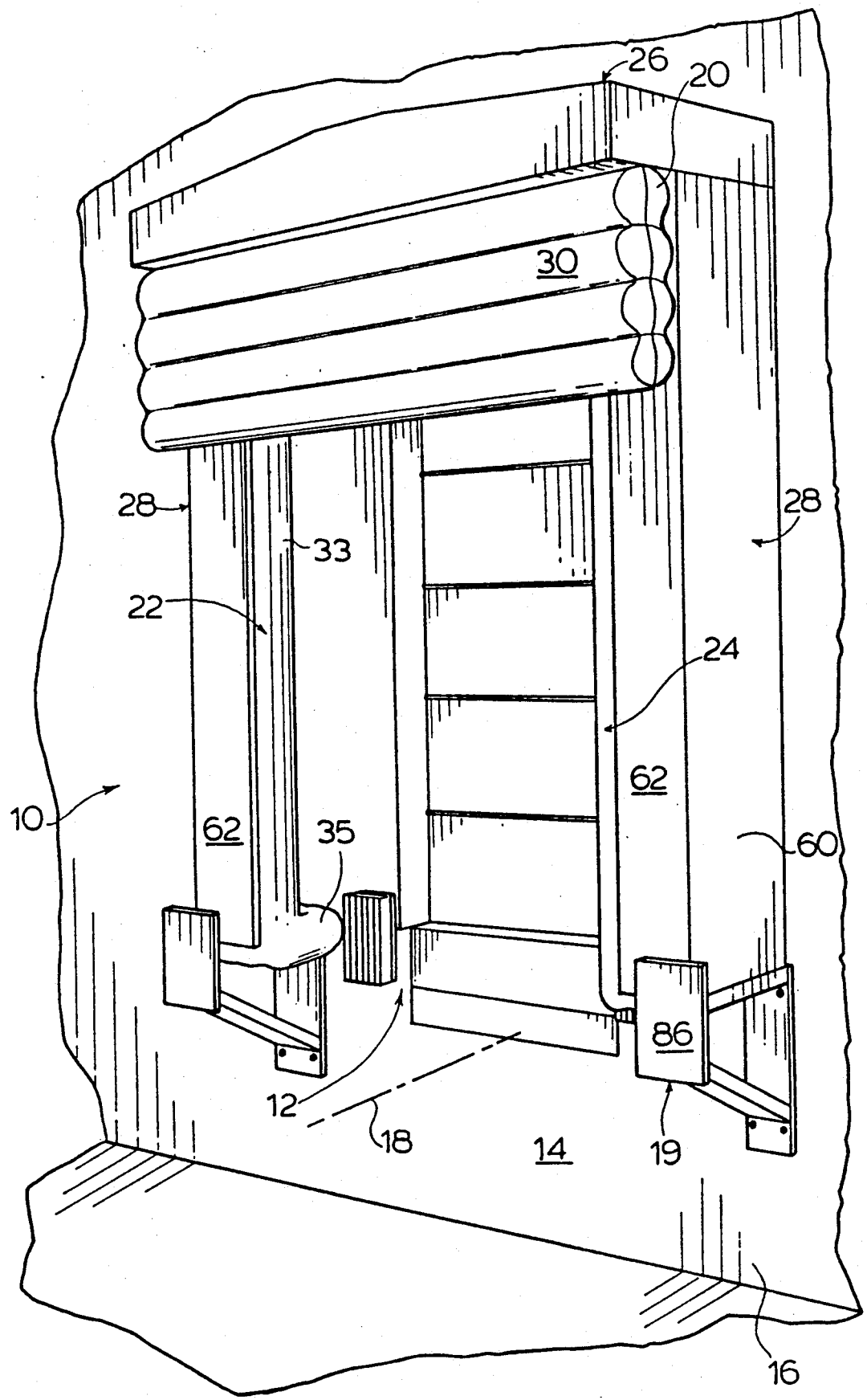
FIG. 1 is a perspective view of an inflated dock seal device of the invention mounted about a loading dock opening in a wall.

With further reference to FIG. 1, a dock seal device 10 is mounted in an opening 12 of a wall 14 having a wall face 16. Opening 12 has a phantom axis of entry 18 being the central line along which a truck to be loaded or unloaded will travel into or out of the loading area of the opening 12.

Bumper guards 19 are mounted on wall 14 below device 10.

Device 10 comprises an upper, generally horizontal inflatable drop curtain 20 and generally L-shaped vertical inflatable side members 22 and 24. It can be seen from FIG. 1 that members 22 and 24 are in opposed facing relationship adjacent the side edges of opening 12, and curtain 20 extends in front of the upper ends of members 22 and 24 and across the upper end of opening 12.

Device 10 further includes an upper support housing 26 in which is housed the upper end of curtain 20; and a pair of side supports 28 which support members 22 and 24. It will be understood that housing 26 and side supports 28 are secured to wall 14 by any convenient means, for example, screws (not shown).

Figure 4:
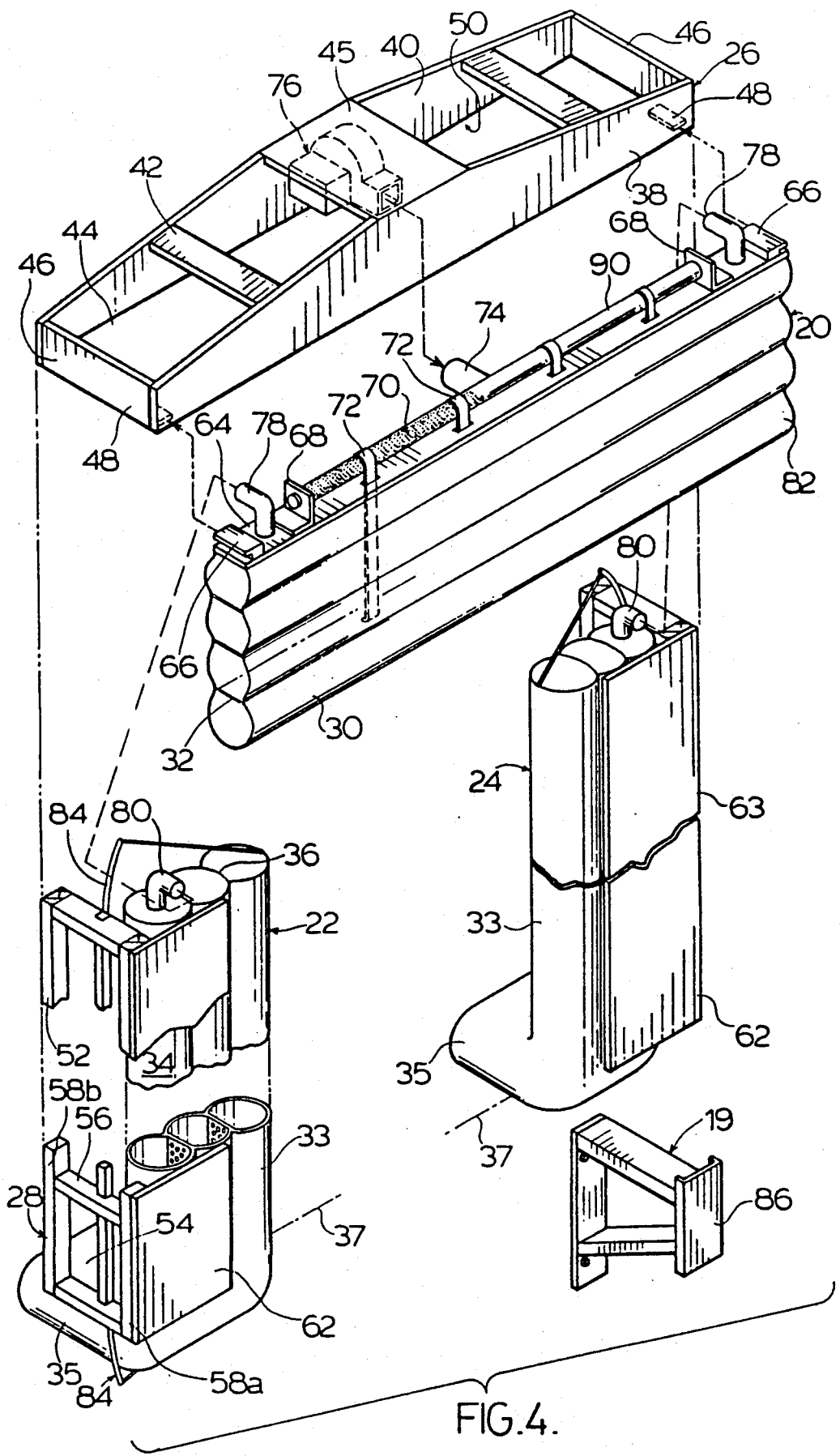
FIG. 4 is an exploded perspective view of the device of FIG. 1.

Curtain 20 includes a plurality of balloon portions 30 separated by internal apertured panels 32, the latter being more particularly shown in FIG. 4.

Figure 2:
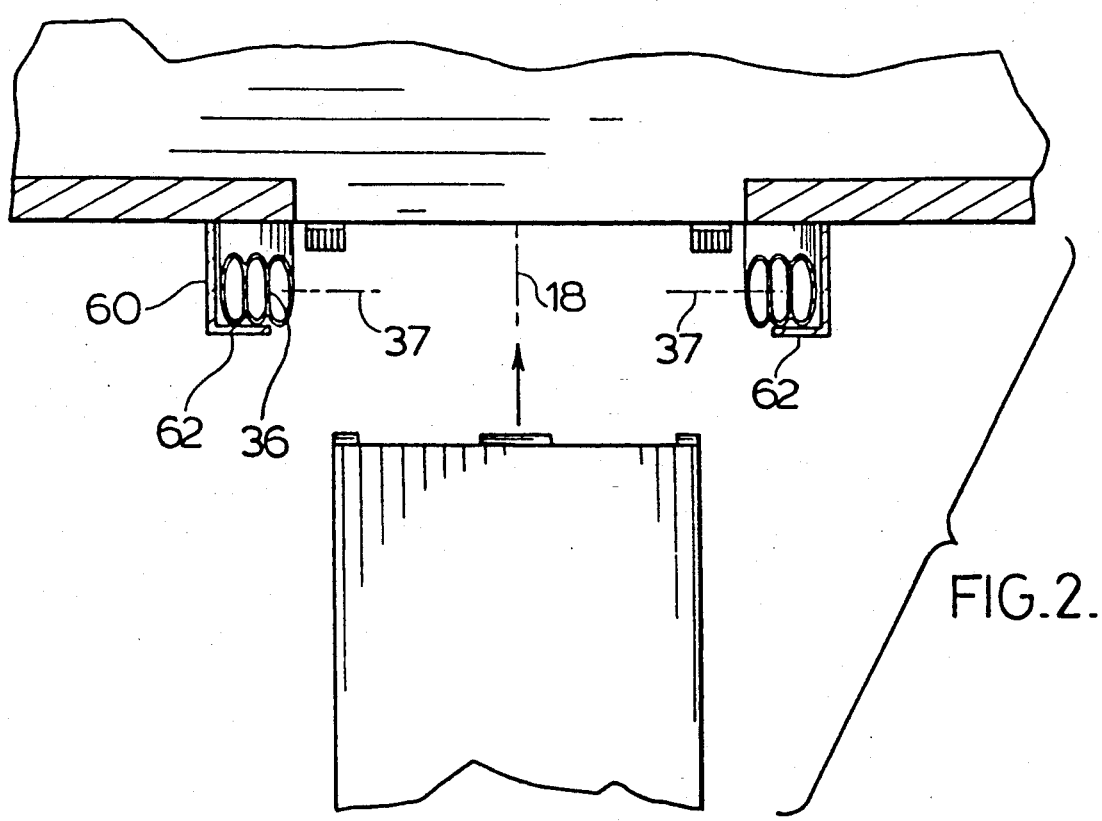
FIG. 2 is a schematic sectional plan view of the lower half of the device of FIG. 1 is a non-inflated configuration.
Figure 3:
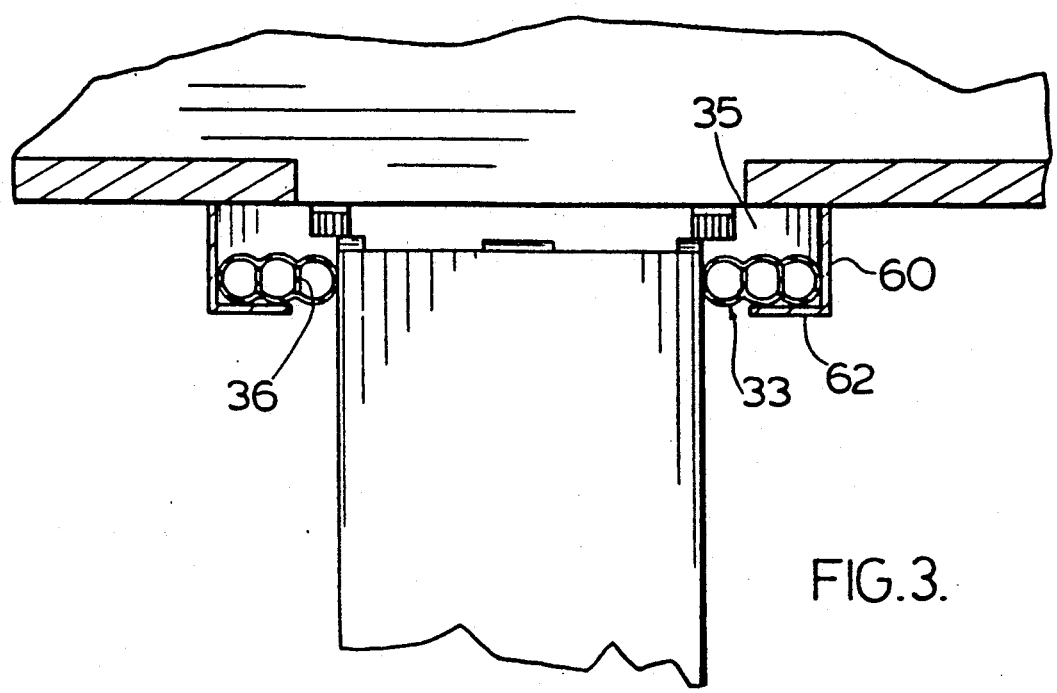
FIG. 3 is a schematic sectional plan view of the lower half of the device of FIG. 1 in an inflated configuration.

The L-shaped members 22 and 24 comprise a generally vertical leg portion 33 and a generally horizontal foot portion 35, both being inflatable. The leg portions 33 comprise balloon portions 34 separated by internal mesh panels 36, the latter being seen in FIGS. 2, 3 and 4.

The L-shaped members have their major axis 37 of inflation extending laterally of the L-shape so that the L-shape expands or inflates laterally. Phantom axis of inflation 37 is perpendicular to phantom axis of entry 18.

With particular reference to FIG. 4, support housing 26 includes a front wall 38, a rear wall 40 and a roof 42, the roof 42 having inclined portions 44 which are inclined downwardly from a generally flat top portion 45. Side walls 46 extend between front wall 38 and rear wall 40, each side wall 46 having a slide groove 48. Housing 26 defines an internal cavity 50.

The side supports 28 each comprise a lattice frame 52 having a plurality of large openings 54 defined between horizontal laths 56 and front and rear vertical studs 58a and 58b, respectively. A clear side panel 60 suitably of translucent plastic sheeting is secured to the outer face of each lattice frame 52 and a clear slip panel 62, suitably of P.V.C. is secured at an outer elongated edge to each stud 58a, whereby the panels 62 extend laterally of the opening 12 generally towards each other and extend freely at their inner ends.

Trim 63 suitably of P.V.C. covers the joint between each panel 62 and its stud 58a.

Drop curtain 20 hangs generally vertically from a curtain support 64. Slide mounts 66 on curtain support 64 engage slide grooves 48, to mount curtain support 64 with drop curtain 20 in housing 26.

A cylinder 90 houses a torsion spring 70 and is mounted between a pair of torsion spring mounts 68 on curtain support 64, the cylinder 90 being mounted for rotary movement in spring mounts 68.

A plurality of retraction straps 72 are secured at one end to cylinder 90, and at a remote end to an internal portion of drop curtain 20, especially an internal portion of curtain 20 remote from support 64.

A motor or air compressor 76 adapted to provide air under pressure is mounted within housing 26 for flow of air under pressure through an air duct 74 communicating with the interior of curtain 20.

Air ducts 78 extend through support 64 to the interior of curtain 20 and are connected to air ducts 80 which communicate with the interior of vertical inflatable members 22 and 24. In this way the interior of inflatable drop curtain 20 and of the separately formed inflatable members 22 and 24 are all in air flow communication with air under pressure delivered from motor 76.

A small air vent 82 is provided in drop curtain 20.

Retractors 84, for example, of elastic or other material having a memory are supported at the upper and lower ends of frame 52 and are connected to vertical inflatable members 22 and 24. In particular the retractors 84 may each comprise an arm mounted to frame 52 and an elastic cord for connection to a vertical member 22, 24.

With further reference to FIGS. 6 and 7, vertical inflatable member 22 has upper and lower retraction systems 92 and 94 in leg 33 and an elastic foot retraction system 96 in foot 35.

Upper retraction system 92 includes a pocket 98 on leg wall 95 housing a counterweight 100, pulleys 102 and 104 mounted on leg wall 95, guide loops 106 adjacent pocket 98 on leg wall 95, and cords 108 and 110.

Cord 108 is connected at one end to counterweight 100, passes over pulley 102 through guide loops 106 and is secured at its other end to leg wall 97.

Cord 110 is connected at one end to counterweight 100, passes over pulley 104 and is secured at its other end to leg wall 97.

Lower retraction system 94 is essentially identical to system 92 and mounted in the same manner.

Elastic retraction system 96 comprises elastic cords 112 and 114 connected at their free ends between side walls 99 and 101 of foot 35, elastic cords 116 and 118 connected between upper and lower walls 103 and 105, respectively, of foot 35, and elastic cord 120 connected between side wall 101 and upper wall 103.

Bumper guards 19 include front cushioning pads 86.

During periods when no loading or unloading is taking place through opening 12, the opening 12 is closed by a conventional door 88. In this condition the seal device 10 is in a non-inflated, retracted condition in which rotation of cylinder 90 has caused retraction straps 72 to wind thereon thereby lifting the folds of material which form drop curtain 20. The upper and lower retractors 84 draw the folds of material of members 22 and 24 towards the lattice frames 52. At the same time, counterweights 100 of retraction systems 92 and 94 draw in the collapsed material of leg 33 and elastic retraction system 96 draws in the collapsed material of foot 35. In this way, the material of the members 22 and 24 is essentially contained in the space defined between the lattice frame 52, slip panels 62 and the wall face 16, as more particularly shown in FIG. 2. When retraction system 96 is employed lower retractor 84 may be dispensed with and vice-versa.

When loading and unloading is to occur, the drop curtain 20 and members 22 and 24 are inflated by continuous flow of air from motor 76 through air duct 74 to the interior of curtain 20 and thence through air ducts 78 and 80 to the interior of members 22 and 24. A constant flow of air into the interior of the device in this way, under slight pressure, is sufficient to overcome the spring pressure of torsion spring 70 so that cylinder 90 is unwound by the downward movement of curtain 20 during inflation, which draws with it straps 72. Similarly the air pressure in inflatable members 22 and 24 during inflation overcomes the retracting force of retractors 84.

In like manner the air pressure in members 22 and 24 during inflation overcomes the elastic retracting force of elastic retraction system 96 as well as the weight retracting force of counterweight 100 of retraction systems 92 and 94.

The air vent 82 permits constant exit of air under pressure from the system whereby a constant flow of air under pressure is introduced by motor 76.

The inflatable curtain 20 and the inflatable members 22 and 24 formed of flexible fabric or material which is air impervious, tear resistant and capable of repeated engagement with vehicles without damage. Suitable materials are vinyl coated nylon, for example, neoprene coated nylon.

In operation, motor 76 provides a constant flow of air under pressure maintaining curtain 20 and members 22 and 24 inflated but yieldable. The system is not airtight, since air escapes continuously from vent 82, so that the curtain 20 and members 22 and 24 are yieldable and are readily deformed responsive to movement of a vehicle to form a pliant, cushioning seal around the vehicle.

When the inflated curtain 20 and members 22, 24 are to be collapsed, motor 76 is switched off and the air escapes through duct 78 and vent 82 under the retracting force of retractors 84 and torsion spring 70.

A particular feature of the present invention is that vertical inflatable members 22 and 24 inflate laterally of the opening 12 directly towards each other and thus in a direction generally perpendicular to phantom axis of entry 18. In this way the device 10 can be constructed such that the inflatable members 22 and 24 have a lateral inflatable length as much as four or five feet which is in marked contrast to the two feet maximum possible with conventional seals which inflate along an arcuate path.

Thus the device 10 of the invention can readily be adapted to openings 12 of various widths.

Another feature of the invention resides in the foot portion 35 which bridges the space between the vertical members 22 and 24 and the opposed wall face 16, thereby providing an inflated bottom seal improving the overall efficiency of the device 10. In conventional sealing devices in which the vertical members inflate along an arcuate path, there is no inflated bottom seal, and the space is either open permitting entry or exit of warm air, or hanging flaps of sheet material are employed to bridge the gap and which must be secured to the wall face 16. In practice, personnel tend to ignore the use of the flaps even when provided, in view of the inconvenience of installation necessary, so that undesired heat loos or heat entry occurs, thereby reducing the efficiency of the system.

Another advantage provided by the present invention resides in the use of the clear side panels 16 in conjunction with the lattice frame 52 having large openings 54. This permits entry of natural light into the opening 12 which would be dark in the absence of adequate artificial lighting. Furthermore, the entry of natural light provides a more comfortable, less claustrophobic working environment.

Still another advantage resides in the clear slip panels 62 which may flex about the joint with stud 58a. The slip panels 62 serve to protect the members 22 and 24 against damage from a truck which may approach the opening 12 in a misaligned configuration. In such situation the protective slip panel 62 will flex and the truck will slide against it without damaging the vertical member 22 or 24.

Still another advantage of the device 10 of the invention resides in the roof 42 having inclined portions 44 which permit flow of water, snow and ice outwardly and away from the front of device 10 where the truck is to be located and where unloading and loading operations are to be conducted. Conventional roofs of dock seal devices are flat and slope forwardly downwardly away from the wall so that such water flows to the front of the dock seal device and on to the roof of a truck, if present, from where it may flow over the sides and seep between the outer truck walls and the inflated members.

Figure 5:
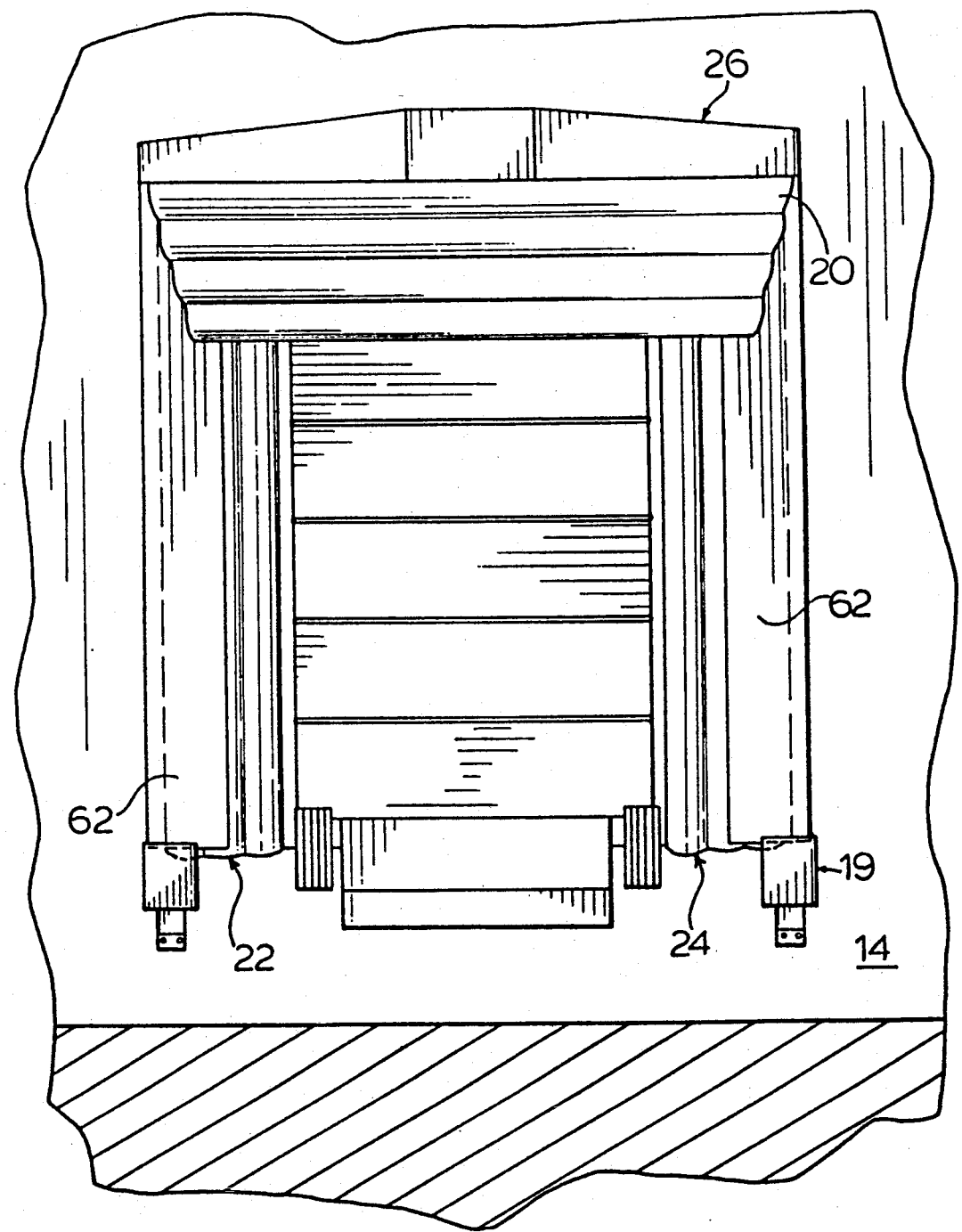
FIG. 5 is a front elevation of the device of FIG. 1.

It will be noted that in FIGS. 1 and 5 the opening 12 is seen closed by a door; this door is, of course, raised during loading and unloading.

I claim:

1. For use with a dock seal device for positioning about an opening in a wall face, which opening has a phantom axis of entry extending through the opening generally perpendicularly of the wall face, and a support structure having a rear end adapted to be positioned on the wall face about the opening such that said support structure projects forwardly of the wall face to a front end spaced apart from the wall face, the improvement being an inflatable seal supported by said support structure, said inflatable seal comprising:

an upper, hollow inflatable member, inflatable by air under pressure, for location in opposed spaced apart relationship with the rear end of the support structure, and a pair of vertical, hollow inflatable members, inflatable by air under pressure, for location in opposed spaced apart relationship with the rear end of the support structure, said vertical inflatable members being in facing spaced apart relationship and being inflatable directly towards each other, laterally of the opening along a phantom axial line of inflation generally perpendicular to the phantom axis of entry, said facing spaced apart relationship of said vertical inflatable members being maintained throughout inflation along said phantom axial line of inflation, and said opposed spaced apart relationship of said inflatable seal and the rear end of the support structure being maintainable throughout inflation of the inflatable seal, wherein said upper inflatable member comprises a horizontal inflatable drop curtain, said inflatable drop curtain and said vertical inflatable members being separately formed and including air ducts connecting the interior of said inflatable drop curtain with the interiors of the vertical inflatable members, and wherein each of said vertical inflatable members has opposed first and second side walls in facing relationship, said facing relationship of said first and second side walls being maintained throughout inflation of said inflatable vertical members, and at least one retraction system housed in each inflatable vertical member comprising a counterweight disposed adjacent said first side wall, first and second adjacent pulleys supported on said first side wall, vertically above said counterweight; a first elastic cord extending elastically from said counterweight over said first pulley to said second side wall, and a second elastic cord extending elastically from said counterweight over said second pulley and being guided along said first wall to a position below said counterweight and thence to said second side wall.

2. For use with a dock seal device for positioning about an opening in a wall face, which opening has a phantom axis of entry extending through the opening generally perpendicularly of the wall face, and a support structure having a rear end adapted to be positioned on the wall face about the opening such that said support structure projects forwardly of the wall face to a front end spaced apart from the wall face, the improvement being an inflatable seal supported by said support structure, said inflatable seal comprising:

an upper, hollow inflatable member, inflatable by air under pressure, for location in opposed spaced apart relationship with the rear end of the support structure, and a pair of vertical, hollow inflatable members, inflatable by air under pressure, for location in opposed spaced apart relationship with the rear end of the support structure, said vertical inflatable members being in facing spaced apart relationship and being inflatable directly towards each other, laterally of the opening along a phantom axial line of inflation generally perpendicular to the phantom axis of entry, said facing spaced apart relationship of said vertical inflatable members being maintained throughout inflation along said phantom axial line of inflation, and said opposed spaced apart relationship of said inflatable seal and the rear end of the support structure being maintainable throughout inflation of the inflatable seal wherein said vertical inflatable members each have an upright, elongate, inflatable leg portion extending generally downwardly of said upper inflatable member, and a short inflatable foot portion extending generally perpendicularly of a lower end of said leg portion, remote from said upper inflatable member.

3. An inflatable seal according to claim 2, wherein said vertical inflatable members each have a front face and the foot portions extending generally rearwardly, perpendicularly of the front faces so as to extend from said front faces towards the opening in the wall face.

4. An inflatable seal according to claim 3, wherein each of the foot portions has an outer side face and an inner side face in facing relationship with each other, said facing relationship being maintained throughout inflation of each said vertical inflatable member.

5. An inflatable seal according to claim 4, wherein said inner and outer side faces of said foot portions are all maintained in opposed, facing relationship throughout inflation of said vertical inflatable member, said side faces of said foot portions extending directly towards each other during inflation.

6. An inflatable dock seal for positioning about an opening in a wall, said seal comprising:

an upper horizontal, inflatable member, first and second vertical, inflatable side members in opposed, spaced apart relationship, said first and second vertical side members each being of generally L-shaped configuration having an upright, elongate, inflatable leg portion extending generally downwardly of said horizontal member, each leg portion terminating at a lower end remotely spaced from said horizontal member in a short, inflatable foot portion extending generally perpendicularly of said leg portion, said first and second vertical side members each having a front face with said foot portions extending generally rearwardly, perpendicularly of the front faces so as to extend from said front faces towards the opening in the wall, each foot portion having an outer side face and an inner side face in facing relationship with each other, said facing relationship being maintained throughout inflation of each said vertical member.

7. A dock seal according to claim 6, wherein said inner and outer side faces of said foot portions are all maintained in opposed, facing relationship throughout inflation of said vertical, side members, said outer side faces of said foot portions extending directly towards each other during inflation.

8. A dock seal according to claim 6, wherein said foot portions have upper and lower opposed foot walls extending perpendicularly rearwardly of the front faces, said foot portions each having an elastic foot retraction system comprising elastic foot cords elastically extending between said outer and inner side faces and elastic foot cords elastically extending between said upper and lower foot walls.

9. A dock seal according to claim 8, wherein said leg portions have opposed first and second side walls extending generally perpendicularly of the front faces, at least one leg retraction system housed in each of said leg portions, comprising a counterweight disposed adjacent said first side wall, first and second adjacent pulleys supported on said first side wall, vertically above said counterweight; a first elastic leg cord extending elastically from said counterweight over said first pulley to said second side wall, and a second elastic leg cord extending elastically from said counterweight over said second pulley and being guided along said first wall to a position below said counterweight and thence to said second side wall.

10. A dock seal according to claim 9, wherein said at least one leg retraction system comprises upper and lower leg retraction systems.

11. For use with a dock seal device for positioning about an opening in a wall face, which opening has a phantom axis of entry extending through the opening generally perpendicularly of the wall face, and a support structure having a rear end adapted to be positioned on the wall face about the opening such that said support structure projects forwardly of the wall face to a front end spaced apart from the wall face, the improvement being an inflatable seal supported by said support structure, said inflatable seal comprising:

an upper, hollow inflatable member, inflatable by air under pressure, for location in opposed spaced apart relationship with the rear end of the support structure, and a pair of vertical, hollow inflatable members, inflatable by air under pressure, for location in opposed spaced apart relationship with the rear end of the support structure, said vertical inflatable members being in facing spaced apart relationship and being inflatable directly towards each other, laterally of the opening along a phantom axial line of inflation generally perpendicular to the phantom axis of entry, said facing spaced apart relationship of said vertical inflatable members being maintained throughout inflation along said phantom axial line of inflation, and said opposed spaced apart relationship of said inflatable seal and the rear end of the support structure being maintainable throughout inflation of the inflatable seal and including an air vent in said inflatable seal permitting constant exit of air under pressure from said inflatable seal, whereby said inflatable seal is yieldable.

12. An inflatable seal according to claim 11, wherein said upper inflatable member and said vertical inflatable members are formed of air impervious, tear resistant, flexible material.

13. For use with a dock seal device for positioning about an opening in a wall face, which opening has a phantom axis of entry extending through the opening generally perpendicularly of the wall face, and a support structure having a rear end adapted to be positioned on the wall face about the opening such that said support structure projects forwardly of the wall face to a front end spaced apart from the wall face, the improvement being an inflatable seal supported by said support structure, said inflatable seal comprising:

an upper, hollow inflatable member, inflatable by air under pressure, for location in opposed spaced apart relationship with the rear end of the support structure, and a pair of vertical, hollow inflatable members, inflatable by air under pressure, for location in opposed spaced apart relationship with the rear end of the support structure, said vertical inflatable members being in facing spaced apart relationship and being inflatable directly towards each other, laterally of the opening along a phantom axial line of inflation generally perpendicular to the phantom axis of entry, said facing spaced apart relationship of said vertical inflatable members being maintained throughout inflation along said phantom axial line of inflation, and said opposed spaced apart relationship of said inflatable seal and the rear end of the support structure being maintainable throughout inflation of the inflatable seal wherein said upper inflatable member comprises a horizontal inflatable drop curtain, said inflatable drop curtain and said vertical inflatable members being separately formed and including air ducts connecting the interior of said inflatable drop curtain with the interiors of the vertical inflatable members, and including an air duct for feeding air under pressure to the interior of said horizontal inflatable drop curtain, and an air vent in said drop curtain permitting constant exit of air under pressure from said drop curtain.

* * * * *